United States Patent Office 3,737,445
Patented June 5, 1973

3,737,445
CATALYTIC CARBONYLATION OF AROMATIC NITROSO COMPOUNDS TO PREPARE CORRESPONDING ISOCYANATES
David Dodman, Kenneth William Pearson, and John Mathers Woolley, Manchester, England, assignors to Imperial Chemical Industries Limited, London, England
No Drawing. Filed Jan. 6, 1969, Ser. No. 789,348
Claims priority, application Great Britain, Jan. 10, 1968, 1,446/68
Int. Cl. C07c 119/04
U.S. Cl. 260—453 PC
3 Claims

ABSTRACT OF THE DISCLOSURE

Aromatic isocyanates are manufactured by reacting an aromatic nitro or nitroso compound with carbon monoxide in the presence of a catalyst which is a mixture of at least one noble metal selected from ruthenium, rhodium, palladium, osmium, iridium and platinum, or a compound of such a metal, and a composition comprising two or more heavy metals in the form of their oxides, hydroxides, carbonates, basic carbonates or basic phosphates, or mixtures thereof, the said composition having been prepared by a procedure including as an essential step either a coprecipitation from solution or a heating together of the heavy metals as their hydroxides or thermally unstable salts.

This invention relates to a process for reacting carbon monoxide with organic aromatic nitro or nitroso compounds, in the presence as catalyst of selected noble metals or compounds thereof in admixture with certain compositions comprising oxygenated compounds of at least two heavy metals, whereby organic aromatic isocyanates may be obtained.

The term "heavy metal" is used herein to denote those elements classified as such in the Periodic Table as it appears on pages 60–61 of Lange's "Handbook of Chemistry," Revised Tenth Edition 1967, published by Mc-Graw-Hill Book Company, with the exceptions of zinc, cadmium, lanthanum, technetium, promethium, polonium, actinium and protactinium; that is to say, those elements having atomic numbers in the ranges 13, 21–29, 31–32, 39–42, 44–47, 49–51, 58–60, 62–83, 90 and 92.

According to the invention there is provided a process for the manufacture of organic aromatic isocyanates, wherein an organic aromatic nitro or nitroso compound is reacted with carbon monoxide in the presence as catalyst of at least one noble metal selected from ruthenium, rhodium, palladium, osmium, iridium and platinum, or a compound of such a noble metal, in admixture with a composition as hereinafter defined comprising two or more heavy metals in the form of their oxides, hydroxides, carbonates, basic carbonates or basic phosphates or mixtures thereof.

Aromatic nitro compounds which are suitable for use in the process of the invention may contain either one or more than one nitro group in the molecule and include nitrobenzene, m-nitroanisole, p-nitroanisole, m-nitrotoluene, p-nitrotoluene, o-fluoronitrobenzene, m-fluoronitrobenzene, p-fluoronitrobenzene, o-chloronitrobenzene, m-chloronitrobenzene, p-chloronitrobenzene, m-bromonitrobenzene, p-bromonitrobenzene, m-iodonitrobenzene, α-nitronaphthalene, 4-nitro-o-xylene, 3,4-dichloronitrobenzene, ethyl p-nitrobenzoate, m-nitrobenzonitrile, 3-nitrodiphenyl, 4-nitrodiphenyl, 4-nitrodiphenylether, m-nitroacetophenone, m-dinitrobenzene, p-dinitrobenzene, 1-chloro-2,6-dinitrobenzene, 2,4- and 2,6-dinitrotoluene and mixtures of two or more thereof.

Preferred aromatic nitro compounds are nitrobenzene, 2,4- and 2,6-dinitrotoluene and mixtures thereof, 3,4-dichloronitrobenzene, p-nitrotoluene, m-bromonitrobenzene, m-dinitrobenzene and p-nitroanisole.

Aromatic nitroso compounds which are suitable for use in the process of the invention may contain either one or more than one nitroso group in the molecule and include nitrosobenzene, m-nitrosoanisole, p-nitrosoanisole, m-nitrosotoluene, p-nitrosotoluene, o-chloronitrosobenzene, m-chloronitrosobenzene, p-chloronitrosobenzene, o-fluoronitrosobenzene, m-fluoronitrosobenzene, p-fluoronitrosobenzene, o-bromonitrosobenzene, m-bromonitrosobenzene, p-bromonitrosobenzene, m-iodonitrosobenzene, m-dinitrosobenzene and p-dinitrosobenzene.

Preferred aromatic nitroso compounds are nitrosobenzene, p-nitrosotoluene, o-chloronitrosobenzene, p-chloronitrosobenzene, m-bromonitrosobenzene, and m-dinitrosobenzene.

Where the noble metal or metals used as components of the catalyst mixture employed in the process of the invention are present as the free metal, it is preferred that they should be carried on a suitable support, such as pumice, alumina, activated carbon, asbestos, fireclay or kieselguhr. Noble metal compounds which may be used as such components include, for example, the oxides, hydroxides, halides, nitrates, sulphates, fatty acid salts and phosphates of the noble metals hereinbefore defined; complex compounds of such metals, for example those containing phosphine, arsine, carbonyl, amine, acetylacetonate or unsaturated hydrocarbon ligands, may also be used. Such compounds may also be carried upon a support, if desired.

Examples of heavy metals as hereinbefore defined which, in the form of their oxides or other oxygen-containing derivatives as aforesaid, are suitable as components of the catalyst mixture used in the process of the invention manganese, iron, cobalt, nickel, copper, silver, tin, cerium, iridium, gold, mercury, lead and bismuth. Heavy metals which are particularly suitable for this purpose are silver, manganese, cobalt, cerium, iron and copper.

The compositions comprising two or more of the foregoing heavy metals in the form of their oxides or other oxygen-containing derivatives which are used in admixture with the aforesaid noble metals or noble metal compounds are prepared by procedures which include as an essential step either a coprecipitation from solution or a heating together of the said heavy metals as their hydroxides or thermally-unstable salts or mixtures thereof. The compositions may, for example, be prepared by precipitating an aqueous solution of mixed heavy metal salts as the oxides, hydroxides, carbonates, basic carbonates or basic phosphates, or as a mixture of these, and washing and drying the precipitate. Alternatively such a composition may, for example, be prepared by heating an intimate mixture of the hydroxides or the formates, acetates, oxalates, carbonates, or other thermally-unstable salts at their decomposition temperatures. A particularly suitable composition is one containing the oxides or other oxygen-containing derivatives of silver and manganese.

Whilst it is not intended that the scope of the present invention should be limited by reference to any theory as to its mechanism of operation, it is believed that the characteristic feature of the above-mentioned compositions which is responsible for their catalytic effect in the process hereinbefore defined is their possession of a fundamental lattice structure composed of atoms of one heavy metal and oxygen atoms or hydroxide, carbonate or phosphate groups, in which atoms of the other heavy metal or metals act as impurities in the lattice resulting in chemical imperfections therein. The procedure of coprecipitation or heating together of the heavy metal compounds is essential to the production of their catalytic effect in the process.

In the foregoing compositions, the relative proportions of the individual oxygen-containing heavy metal compounds may vary widely and the proportions giving the optimum catalytic effect when in admixture with the noble metal or compound thereof will depend upon the particular heavy metals present. In general, the best results are obtained when any given heavy metal compound is present in an amount of from 5% to 50% of the total weight of the composition, but in certain cases an amount of as little as 1% by weight may be effective.

If desired, the aforesaid heavy metal-containing compositions may also be carried on a support such as any of those hereinabove mentioned.

The carbon monoxide used in the process of the reaction may optionally be employed in admixture with a carrier gas or gaseous diluent, provided that such other gaseous constituent is inert under the conditions of reaction. Examples of gases which may be so employed include nitrogen and carbon dioxide. It is, however, essential that the carbon monoxide should be free from hydrogen or water vapour, since otherwise the process may lead to the formation of products such as amines or ureas rather than isocyanates.

There may likewise be used in the process of the invention diluents which are normally liquid, again provided that such diluents remain inert under the reaction conditions. Suitable inert liquid diluents include hydrocarbons such as hexane and halogenated derivatives of hydrocarbons such as 1,1,2-trichloro-1,2,2-trifluoroethane, chlorobenzene, o-dichlorobenzene and 1,2,4-trichlorobenzene.

It is however, essential that water or hydroxylic solvents should be absent since these provide a source of abstractable hydrogen and promote the formation of amine or urea by-products; other oxygenated solvents such as ethers or ketones are also liable to lead to undesirable side-reactions and should in general be avoided.

The process may be carried out by either a batchwise or a continuous procedure. The invention may be operated continuously by passing the aromatic nitro or nitroso compound either in the liquid phase (i.e. in the liquefied state or in solution) or in the vapour phase together with the carbon monoxide through a bed of the catalyst mixture. Either fixed bed or fluidised bed techniques may be adopted and the flow of liquid and gas respectively may be in either the same or opposite directions through the bed, as desired. A fluidised bed technique is particularly advantageous, however, since by this means a high degree of reaction may be achieved with short contact times, of the order of only 1 minute. When such a technique is employed, it is particularly desirable that all the components of the catalyst mixture are carried on a suitable support.

Any suitable reaction temperature may be employed, but a temperature in excess of 100° C. is preferred.

The process may in general be carried out over a wide range of pressures, from normal atmospheric pressure up to 150 atmospheres. Occasionally it may be desirable to employ pressures in excess of this figure; however many monoisocyanates may be obtained by reaction at essentially atmospheric pressure.

Carbon dioxide produced in the process may be removed by passing the effluent gases through a suitable scrubber and any residual carbon monoxide may then be recirculated through the reaction zone, if desired, together with fresh amounts of nitro or nitroso compound; alternatively the effluent gases may be contacted with carbon at a high temperature to reduce the carbon dioxide present to carbon monoxide, which may then be recirculated.

If desired, the catalyst mixture used in the process may be subjected prior to carrying out the reaction to a stream of carbon monoxide alone (i.e. in the absence of the nitro or nitroso compound), preferably at an elevated temperature under atmospheric pressure and in the absence of a solvent. This procedure may be carried out either on the noble metal constituents of the mixture or on the heavy metal-containing composition, or both, before they are admixed, or on both these constituents after they have been admixed.

In the complete specification filed in our copending British applications Nos. 53,636/67 and 15,392/68 a process is described for the manufacture of, inter alia, aromatic nitroso compounds in which an aromatic nitro compound is contacted with carbon monoxide in the presence of a catalyst comprising two or more heavy metals as their oxides, hydroxides, carbonates, or basic phosphates, or as partial reduction products thereof, said catalyst having been prepared by a procedure including as a step either a coprecipitation or a heating together of the heavy metals as their hydroxides or heat unstable salts, and the contact being maintained for a time insufficient to produce substantial proportions of over-reduction products. The products of such a process may be employed in the process of the present invention either with or without intermediate isolation. In suitable cases, following the conversion of the aromatic nitro compound in the above-mentioned manner, it may merely be necessary to introduce into the catalyst composition defined above the noble metal or noble metal compound as hereinbefore defined and then to continue the reaction, in order to perform the further conversion of such a product to an isocyanate.

The invention is illustrated but not limited by the following examples, in which parts are by weight unless otherwise stated:

EXAMPLE 1

A catalyst based on a mixture of oxides of silver and manganese is prepared as follows:

16.25 parts of manganese acetate hydrate, mol. wt. 245, are dissolved in water and 17.50 parts of concentrated nitric acid are added. 10.675 parts of silver nitrate are then added as solution in water. 50 parts of pumice granules (size 150–200 mesh) and 30 parts of pumice (size 100–150 mesh) are stirred into the solution and the resulting slurry is treated with 5% caustic soda solution until the suspension reacts strongly by alkaline. The mixture is allowed to settle, the supernatant liquor is decanted and the residue is washed repeatedly with water by decantation until the supernatant liquor no longer shows an alkaline reaction. The slurry is then filtered and the residue on the filter is washed with methyl alcohol, then with acetone and dried by heating at 100° C. for several hours.

21 parts of the supported catalyst prepared as above are mixed with 4 parts of 5% palladium on pumice granules (100–150 mesh) and the mixture is charged into a reactor, surrounded by a heating bath. The bath is heated to 230° C. and the catalyst bed is subjected to a stream of carbon monoxide for about 2 hours. The bath is then cooled to 190° C. and carbon monoxide and nitrosobenzene are fed simultaneously into the reactor in the proportion of 3.75 parts of carbon monoxide per hour to 1.5 parts of nitrosobenzene per hour. This rate of flow of the reactants is sufficient to maintain the catalyst bed in a fluidised state. By condensation of the exit gases from the reactor in a solid carbon dioxide trap there is obtained, under steady state conditions, a liquid which by fractional distillation is shown to consist of a mixture of nitrosobenzene and phenylisocyanate in the proportion 1 to 19 parts by weight.

EXAMPLE 2

Example 1 is repeated with the nitrosobenzene feed being replaced by a feed of 3 parts per hour of nitrobenzene.

From the exit gases under steady state conditions there is obtained a condensate which by fractional distillation is shown to consist of a mixture of unreacted nitrobenzene and phenyl isocyanate in the proportion of 19 to 1 parts by weight.

EXAMPLE 3

Example 1 is repeated but in place of the nitrosobenzene there are used p-nitroanisole, o-chloronitrosobenzene and p-chloronitrosobenzene respectively at reaction temperatures ranging from 200° to 240° C. Analysis of the products by fractional distillation indicates the presence of the corresponding isocyanate in conversions of up to 50% of the nitroso compound.

EXAMPLE 4

Example 1 is repeated but in place of the silver-manganese oxide catalyst there are used mixtures prepared in a similar manner of the following metal oxides supported on pumice: gold-manganese (5–10 mole percent of gold), iridium-manganese (2–5 mole percent of iridium), cobalt-manganese (20–30 mole percent of cobalt) and nickel-cobalt-manganese (5 mole percent of nickel and 20–30 mole percent of cobalt) at reaction temperatures of 190 to 210° C. Conversions of nitrosobenzene of from 10% to 30% are obtained in each case.

EXAMPLE 5

Example 2 is repeated except that in place of the nitrobenzene there are used p-nitrotoluene, m-bromonitrobenzene and m-dinitrobenzene respectively at reaction temperatures of 215° to 250° C. Analysis of the products by gas-liquid chromatography indicates conversions of 5% to 15% of the nitro compounds to the corresponding isocyanates.

EXAMPLE 6

2.17 parts of cerous nitrate, $Ce(NO_3)_3 6H_2O$ (free from contamination with other rare earth metals) and 0.25 part of ferric nitrate, $Fe(NO_3)_3 6H_2O$, are dissolved in 5 parts of water. The solution is adsorbed onto 10 parts of porous earthenware chips of particle size 10 to 20 mesh which are then dried at 100° C. The chips are then heated at a temperature of 400° C. for 2 hours, to decompose the nitrates to a mixture of oxides. After cooling, a solution of 0.1 part of rhodium stearate in 10 parts of toluene is added to the chips and the toluene is removed by distillation.

10 parts of the catalyst so prepared are packed into a reaction column having a ratio of length to diameter of 25:1, surrounded by a heating element; the column has at its upper end inlets for nitrobenzene and carbon monoxide. The heating element is set to give a column temperature of 150° C. and carbon monoxide and nitrobenzene are fed in simultaneously in the proportion of 6000 parts by volume of carbon monoxide per hour and 2 parts by weight of nitrobenzene per hour. The exit products are passed into a scrubbing column containing porcelain rings down which anhydrous n-butanol flows in countercurrent to the flow of the exit products. The butanol washings are collected over a period of three hours. The washings are then subjected to vacuum distillation at 100° C. to remove the solvent, and the residue is analysed by thin layer chromatography, indicating the presence of n-butylphenyl-urethane derived from phenyl isocyanate in the exit gases from the reaction column. Estimation of the n-butylphenyl-urethane by gas liquid chromatography indicates a conversion rate of ca. 10% based on the amount of nitrobenzene passed through the catalyst.

EXAMPLE 7

A catalyst based on a mixture of oxides of silver and manganese is prepared as follows:

16.25 parts of manganese acetate hydrate, mol. wt. 245, are dissolved in 25 parts of water and 10 parts of concentrated nitric acid. 16.67 parts of silver nitrate are dissolved in 50 parts of water and the solution added to the above manganese nitrate solution. 15 parts of pumice granules (size 60 to 100 mesh), 15 parts of pumice (size 100 to 150 mesh) and 10 parts of pumice (size 150 to 200 mesh) are stirred into the solution and the resulting slurry is treated with 50% caustic soda solution until the suspension reacts strongly alkaline. The mixture is allowed to settle, the supernatant liquor is decanted and the residue is washed repeatedly with water by decantation until the supernatant liquor no longer shows an alkaline reaction. The slurry is then filtered, the residue on the filter is washed with acetone and dried by heating at 100° C. for several hours.

25 parts of the supported catalyst so prepared are mixed with 4 parts of 10% palladium on pumice granules (size 100 to 150 mesh) and the mixture is heated for 16 hours at 600° to 650° C. The catalyst is charged into a reactor of the type used in Example 1 and is then subjected to a stream of carbon monoxide for 3 hours, whilst being heated at 250° C. The catalyst bed is then cooled to 195° C. and carbon monoxide and nitrosobenzene are fed simultaneously into the reactor in the proportion of 3.75 parts of carbon monoxide per hour to 1.5 parts of nitrosobenzene per hour. Condensation of the exit gases from the reactor, in a solid carbon dioxide trap, gives, under steady state conditions, a solid which is shown by gas-liquid chromatography to contain 20% by weight of phenyl isocyanate.

EXAMPLE 8

Example 7 is repeated but the palladium-on-pumice component of the catalyst is replaced by 10% palladium oxide on pumice, 15% palladous chloride on pumice and 15% palladous nitrate on pumice respectively. In each case conversions of nitrosobenzene to phenylisocyanate comparable to that of Example 7 are obtained.

EXAMPLE 9

Example 7 is repeated using as catalyst 25 parts of a mixture of oxides of silver and manganese obtained from 10.675 parts of silver nitrate and 16.25 parts of manganese acetate, supported on pumice together with 4 parts of 10% palladium supported on alumina.

Under steady state conditions there is obtained from the exit gases a condensate which is shown by gas-liquid chromatography to contain 30% by weight of phenyl isocyanate.

EXAMPLE 10

Example 9 is repeated using as catalyst 25 parts of the same mixture of oxides of silver and manganese as is used therein together with 7 parts of 5% rhodium supported on carbon.

Under steady state conditions there is obtained from the exit gases a condensate which is shown by gas-liquid chromatography to contain 25% by weight of phenyl isocyanate.

Replacement of the 5% rhodium or carbon by an equal weight of 5% iridium on carbon gives a 20% conversion of nitrosobenzene to phenyl isocyanate.

EXAMPLE 11

Example 9 is repeated using as catalyst 25 parts of the same mixture of oxides of silver and manganese as is used therein together with 7 parts of 5% platinum supported on pumice (size 100–150 mesh).

Under steady state conditions there is obtained from the exit gases a condensate which is shown by gas-liquid chromatography to contain 12% by weight of phenyl isocyanate.

If the mixture of silver and manganese salts used in Example 9 is reacted with sodium carbonate solution instead of sodium hydroxide solution, a catalyst comprising a mixture of basic carbonates of silver and manganese is obtained. Use of 25 parts of this catalyst mixed with 7 parts of 5% platinum or alumina after heat treatment at 600–650° C. as described before gives a 10% yield of phenyl isocyanate.

EXAMPLE 12

Example 9 is repeated using as catalyst 25 parts of the same mixture of oxides of silver and manganese as is used therein together with 7 parts of 5% ruthenium or alumina.

Under steady state conditions there is obtained from the exit gases a condensate which is shown by gas-liquid chromatography to contain 14% by weight of phenyl isocyanate.

EXAMPLE 13

A catalyst based on a mixture of oxides of silver and manganese is prepared by the method described in Example 7 from 16.25 parts of manganese acetate, 10.675 parts of silver nitrate and 40 parts of alumina.

25 parts of this catalyst are mixed with 4 parts of 10% palladium or alumina and heated for 16 hours at 600° to 650° C. This catalyst mixture is then prereduced with carbon monoxide as described in Example 7 and then cooled to 195° C. Carbon monoxide and nitrobenzene are then fed simultaneously into a reactor as described in Example 1 in the proportions of 3.75 parts of carbon monoxide per hour to 1.1 parts of nitrobenzene per hour. Under steady state conditions there is obtained from the exit gases, a condensate, which is shown by gas-liquid chromatography to contain 40% by weight of phenyl isocyanate.

EXAMPLE 14

A catalyst based on a mixture of oxides of lead and manganese is prepared as follows:

9.9 parts of lead nitrate are dissolved in 100 parts of water and 46 parts of a 50% w./w. solution of manganous nitrate added. 20 parts of pumice (size 60–100 mesh), 20 parts of pumice (size 100–150 mesh) and 15 parts of pumice (size 150–200 mesh) are stirred into the solution and the resulting slurry is treated with 50% caustic soda solution until the suspension reacts strongly alkaline. The mixture is allowed to settle, the supernatant liquor is decanted and the residue is washed by decantation until the supernatant liquor no longer shows an alkaline reaction. The slurry is then filtered, the residue on the filter is washed with acetone and dried by heating at 100° C.

25 parts of the supported catalyst so prepared are mixed with 4 parts of 10% palladium on carbon and heated for 16 hours at 300° C. The catalyst is then charged into a reactor as described in Example 1 and is subjected to a stream of carbon monoxide for 3½ hours, whilst being heated at 250° C. The catalyst bed is then cooled to 200° C. and carbon monoxide and nitrosobenzene are fed simultaneously into the reactor in the proportions of 3.75 parts of carbon monoxide per hour to 1.1 parts of nitrosobenzene per hour. Under steady state conditions there is obtained a condensate which is shown by gas liquid chromatography to contain 9% by weight of phenyl isocyanate.

EXAMPLE 15

A catalyst based on a mixture of oxides of silver and manganese is prepared by the method described in Example 1 from 16.25 parts of manganese acetate, 10.675 parts of silver nitrate and 5 parts of kieselguhr.

10 parts of the catalyst so prepared are mixed with 2 parts of 10% palladium on carbon and 0.5 part of palladium chloride and heated for 16 hours at 600° C. The catalyst is charged into a reactor, together with 20 parts of p-nitroanisole and the mixture is then stirred and heated to 275° C. Carbon monoxide is then fed into the reactor at the rate of 3.75 parts per hour for 8 hours and the reaction mixture is then analysed by gas-liquid chromatography and found to contain 2 parts by weight of p-methoxy phenylisocyanate.

EXAMPLE 16

A catalyst based on a mixture of oxides of lead and manganese is prepared as described in Example 15 by replacing the 30 parts of silver nitrate with 36 parts of lead nitrate.

10 parts of the catalyst so prepared are heated for 16 hours at 300° C. and charged into a reactor, together with 0.5 part of 5% rhodium on carbon, 0.05 part of tetra rhodium dodecacarbonyl, 0.05 part of rhodium bisacetylacetonate and 20 parts of nitrobenzene. The mixture is then stirred and heated to 210° C. and carbon monoxide is then fed into the reactor at the rate of 3.75 parts per hour for 6 hours. Condensation of the exit gases from the reactor gives a solid which is shown by gas-liquid chromatography to contain 8% by weight of phenyl isocyanate.

EXAMPLE 17

Example 16 is repeated using as catalyst 10 parts of the same mixture of oxides of lead and manganese as is used therein together with 2 parts of 5% palladium on carbon and 0.1 part of bis pyridine palladous chloride.

From the exit gases after 6 hours there is obtained a condensate which is shown by gas-liquid chromatography to contain 9% by weight of phenyl isocyanate.

If the lead nitrate used in the preparation of the catalyst is replaced by an equal weight of bismuth nitrate, mercuric chloride or stannous chloride, catalysts comprising the mixed oxides of bismuth-manganese, mercury-manganese and tin-manganese respectively may be obtained. Replacement of the lead-manganese catalyst used above by any of these mixtures gives comparable yields of phenyl isocyanate.

EXAMPLE 18

A catalyst comprising a mixture of copper and cerium oxides is prepared as follows:

18.25 parts of cupric nitrate trihydrate and 295.3 parts of cerous nitrate hexahydrate are dissolved in water and sodium hydroxide solution is added with stirring until in excess. 2700 parts of fine pumice (passing BS 180 mesh sieve) are stirred in and the product is filtered off and dried at 100°. It is then heated at 400°–500° C. for 4 hours before use.

500 parts of the supported catalyst are mixed with 500 parts of ntitrosobenzene, 10 parts of rhodium trichloride and 3320 parts of chlorobenzene and charged to an autoclave. Carbon monoxide is introduced into the autoclave until a pressure of 100 ats. is obtained and the autoclave and contents are heated to 150° C. and kept at that temperature for 3 hours, then heated to 190° C. and cooled immediately. The autoclave is vented and the contents discharged and filtered. Gass-liquid chromatographic analysis of the product shows a conversion of nitrosobenzene to phenyl isocyanate of 10.5%.

EXAMPLE 19

A catalyst comprising a mixture of silver and manganese oxides is prepared as described in Example 15. The catalyst is heated at 400° C. for 4 hours before use.

5 parts of nitrosobenzene are mixed with 5 parts of the above catalyst and 0.25 part of 3% paladium on charcoal (previously dried at 120° C. under reduced pressure), 33.2 parts of chlorobenzene are added and the whole is charged to a stainless steel autoclave. Carbon monoxide is introduced to give a pressure of 120 atmospheres and the autoclave and contents are heated to 150° C. and kept at that temperature for 3 hours, then heated to 190° C. and immediately cooled. The autoclave is vented and the contents discharged and filtered. Fractional distillation of the product under reduced pressure shows a conversion of nitrosobenzene to phenyl isocyanate of 26%.

Replacement of the nitrosobenzene by m-bromo nitrosobenzene and m-dinitrosobenzene respectively is shown by gas-liquid chromatographic analysis of the products to give similar yields of the corresponding isocyanates to that obtained above.

What we claim is:

1. A process for preparing an aromatic isocyanate which comprises reacting at a temperature above 100° C. and in the absence of water or a hydroxylic solvent, carbon monoxide and a member selected from the group consisting of aromatic mono- and di-nitroso compounds in the presence of a catalyst consisting essentially of (1) a noble metal selected from the group consisting of ruthenium, rhodium, palladium, iridium and platinum and (2) a composition consisting essentially of a mixture of two heavy metals in the form of their oxides, one of said heavy metal oxides being manganese oxide and the other heavy metal being an oxide of a metal selected from the group consisting of silver, gold, iridium, cobalt, nickel and lead, said composition being prepared either by co-precipitation from solution or heating together of said heavy metals as their hydroxides or thermally unstable salts or mixtures thereof.

2. The process of claim 1 wherein said aromatic mono- and di-nitroso compounds are selected from the group consisting of nitrosobenzene, p-nitrosotoluene, o-chloronitrosobenzene, p-chloronitrosobenzene, m-bromonitrosobenzene and m-dinitrosobenzene.

3. The process of claim 1 wherein said composition is a mixture of manganese oxide and silver oxide.

References Cited

UNITED STATES PATENTS

| | | | |
|---|---|---|---|
| 3,461,149 | 8/1969 | Hardy et al. | 260—453 |
| 3,467,687 | 9/1969 | Hardy et al. | 260—453 |
| 3,481,967 | 12/1969 | Ottmann et al. | 26—453 |
| 3,481,968 | 12/1969 | Ottmann et al. | 260—453 |
| 3,637,786 | 1/1972 | Smith | 260—453 P |

FOREIGN PATENTS 1,025,436  4/1966  Great Britain.

LEWIS GOTTS, Primary Examiner

D. H. TORRENCE, Assistant Examiner

U.S. Cl. X.R.

252—437, 440, 441, 466 R, 471